United States Patent
Anselmino et al.

(10) Patent No.: US 9,664,437 B2
(45) Date of Patent: May 30, 2017

(54) REFILLABLE CONSUMABLE BEVERAGE FLAVORING CARTRIDGE

(75) Inventors: Philip A. Anselmino, Saint Joseph, MI (US); Kevin M. Chase, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 530 days.

(21) Appl. No.: 12/915,342

(22) Filed: Oct. 29, 2010

(65) Prior Publication Data

US 2012/0102999 A1    May 3, 2012

(51) Int. Cl.
| | |
|---|---|
| F25D 3/00 | (2006.01) |
| F25D 11/02 | (2006.01) |
| B67B 7/00 | (2006.01) |
| B65D 88/54 | (2006.01) |
| A47J 31/44 | (2006.01) |
| A47J 31/06 | (2006.01) |
| F25D 23/12 | (2006.01) |
| B67D 3/00 | (2006.01) |
| A47J 31/40 | (2006.01) |
| A47J 31/00 | (2006.01) |

(52) U.S. Cl.
CPC ............ *F25D 23/126* (2013.01); *A47J 31/00* (2013.01); *A47J 31/06* (2013.01); *A47J 31/407* (2013.01); *B67D 3/0019* (2013.01); *F25D 2323/121* (2013.01)

(58) Field of Classification Search
CPC .. B67D 3/0019; F25D 2313/121; A47J 31/00; A47J 31/06; A47J 31/407

USPC ......... 62/389, 441; 222/1, 325; 99/295, 290, 99/323, 307

See application file for complete search history.

(56) References Cited

U.S. PATENT DOCUMENTS

| | | | | |
|---|---|---|---|---|
| 5,992,685 | A * | 11/1999 | Credle, Jr. ........................ 222/1 |
| 6,241,893 | B1 * | 6/2001 | Levy .............................. 210/660 |
| 6,289,948 | B1 | 9/2001 | Jeannin et al. |
| 6,347,651 | B2 | 2/2002 | Jeannin et al. |
| 6,470,920 | B2 | 10/2002 | Jeannin et al. |
| 6,557,597 | B2 | 5/2003 | Riesterer |
| 6,658,989 | B2 | 12/2003 | Sweeney et al. |
| 6,786,134 | B2 | 9/2004 | Green |
| 6,948,420 | B2 | 9/2005 | Kirschner et al. |
| 7,127,983 | B2 * | 10/2006 | Huda et al. .................... 99/306 |
| 7,513,412 | B2 | 4/2009 | Benedetti et al. |
| 7,997,448 | B1 * | 8/2011 | Leyva ........................ 222/129.1 |

(Continued)

*Primary Examiner* — Ryan J Walters
*Assistant Examiner* — Joseph Trpisovsky
(74) *Attorney, Agent, or Firm* — Nyemaster Goode P.C.

(57) ABSTRACT

A refrigerator includes a refrigerator cabinet, a freezer compartment, a fresh food compartment, a door providing access to the refrigerator, and a beverage dispensing system. The beverage dispensing system includes a beverage cartridge. The beverage cartridge includes a filter, a pump, and a beverage medium, wherein the beverage medium is combined with water to produce a flavored beverage. The beverage medium may be a powder or a syrup, which when mixed with water, produces a desired flavored beverage. The beverage cartridge is combined and connected with the beverage dispensing unit to filter and pump water in to pass through and mix with the flavor medium to produce a flavored beverage which may be passed through the refrigerator to an output where a user can fill a container with the flavored beverage.

16 Claims, 6 Drawing Sheets

(56) References Cited

U.S. PATENT DOCUMENTS

| | | | |
|---|---|---|---|
| 2006/0043101 A1* | 3/2006 | Bhimani et al. | 222/1 |
| 2006/0283884 A1* | 12/2006 | Saggin et al. | 222/129.4 |
| 2008/0149669 A1* | 6/2008 | Nicholson et al. | 222/129.1 |
| 2009/0178570 A1* | 7/2009 | Minard et al. | 99/289 R |
| 2010/0147414 A1* | 6/2010 | Nighy et al. | 141/10 |
| 2010/0154459 A1* | 6/2010 | Skalski et al. | 62/389 |
| 2010/0193544 A1* | 8/2010 | Rusch et al. | 222/82 |

* cited by examiner

REFILLABLE CONSUMABLE BEVERAGE FLAVORING CARTRIDGE

FIELD OF THE INVENTION

The present invention relates to the field of refrigerators. More specifically, but not exclusively, the present invention provides a reusable and refillable cartridge containing a beverage flavoring for use with a beverage dispensing system of a refrigerator.

BACKGROUND OF THE INVENTION

Many modern refrigerators contain some sort of beverage dispenser systems. While often times the beverage dispensers consist solely of water lines to dispense water or ice, more sophisticated beverage dispensers may incorporate flavored beverages. The flavored beverages may be produced by passing water through a beverage medium, such as a powder or syrup. The mixture of a beverage medium and water create beverages of different flavors. The beverage media may be stored in cartridges, which are incorporated into the beverage dispensing system.

One problem relates to cartridges which are "single use" cartridges. This means that after the cartridges and their contents are fully used, the entire cartridge is disposed of. By disposing the cartridges, consumers have a negative impact on the environment. Replacing a cartridge after each use may also be costly.

Reuse of single use cartridges may also lead to the risk of chemicals leaching from the cartridge material. There may also be a risk of bacteria growth in the cartridges, which could damage the health of the consumers. Thus, single use cartridges are problematic for a variety of reasons.

Accordingly, there is a need in the art for a cartridge used with an appliance having a beverage dispensing system that is refillable and reusable.

BRIEF SUMMARY OF THE INVENTION

One aspect of the present invention to provide an improved cartridge for use with a dispensing system of an appliance that can be refilled with a beverage medium and reused in the same appliance multiple times.

Another aspect of the present invention is to provide an improved cartridge that reduces the number of components needed in a beverage dispensing system to produce a flavored beverage.

Another aspect of the present invention is to provide an improved cartridge that incorporates beverage medium-specific filters to use for producing a flavored beverage.

Another aspect of the present invention is to provide an improved method for producing a flavored beverage in an appliance, using water and a beverage medium.

According to an aspect of the present invention, a refrigerator is provided. The refrigerator includes a refrigerator cabinet, a freezer compartment disposed within the refrigerator cabinet, a fresh food compartment disposed within the refrigerator cabinet, at least one door providing access to the fresh food compartment, a beverage dispensing system disposed within the food compartment, and a removable cartridge connected to the beverage dispensing system. The cartridge includes a filter, a pump, and a beverage medium.

According to another aspect of the present invention, a method of reusing a flavor cartridge in a refrigerator beverage dispensing system or a refrigerator to produce a flavored beverage is provided. The method includes providing a reusable cartridge filled with a beverage medium. The cartridge also includes a filter. Water is passed through the filter to produce filtered water. The filtered water is passed through the beverage dispensing system, including the beverage medium of the cartridge, to produce the flavored beverage for dispensing from the refrigerator.

According to another aspect of the present invention, a refrigerator is provided. The refrigerator includes a refrigerator cabinet, a freezer compartment disposed within the refrigerator cabinet, a fresh food compartment disposed within the refrigerator cabinet, at least one door providing access to the fresh food compartment, a beverage dispensing system disposed within the food compartment, and a cartridge removable connected to the beverage dispensing system. The cartridge includes an access port, a pump, and a beverage medium.

According to another aspect of the present invention, a refillable consumable beverage flavoring cartridge is provided. The cartridge includes a cartridge housing configured to connect with a beverage dispenser of a refrigerator. A filter is disposed within the cartridge housing. A pump is disposed within the cartridge housing. A beverage medium is disposed within the beverage housing.

DETAILED DESCRIPTION OF THE INVENTION

Although the present invention is described with respect to various embodiments, the present invention is not to be limited to the specific embodiments described herein. It is further to be understood that no single embodiment of the present invention need have all of these structures to perform all the functions associated with any particular aspect or embodiment of the invention.

Figure 1:
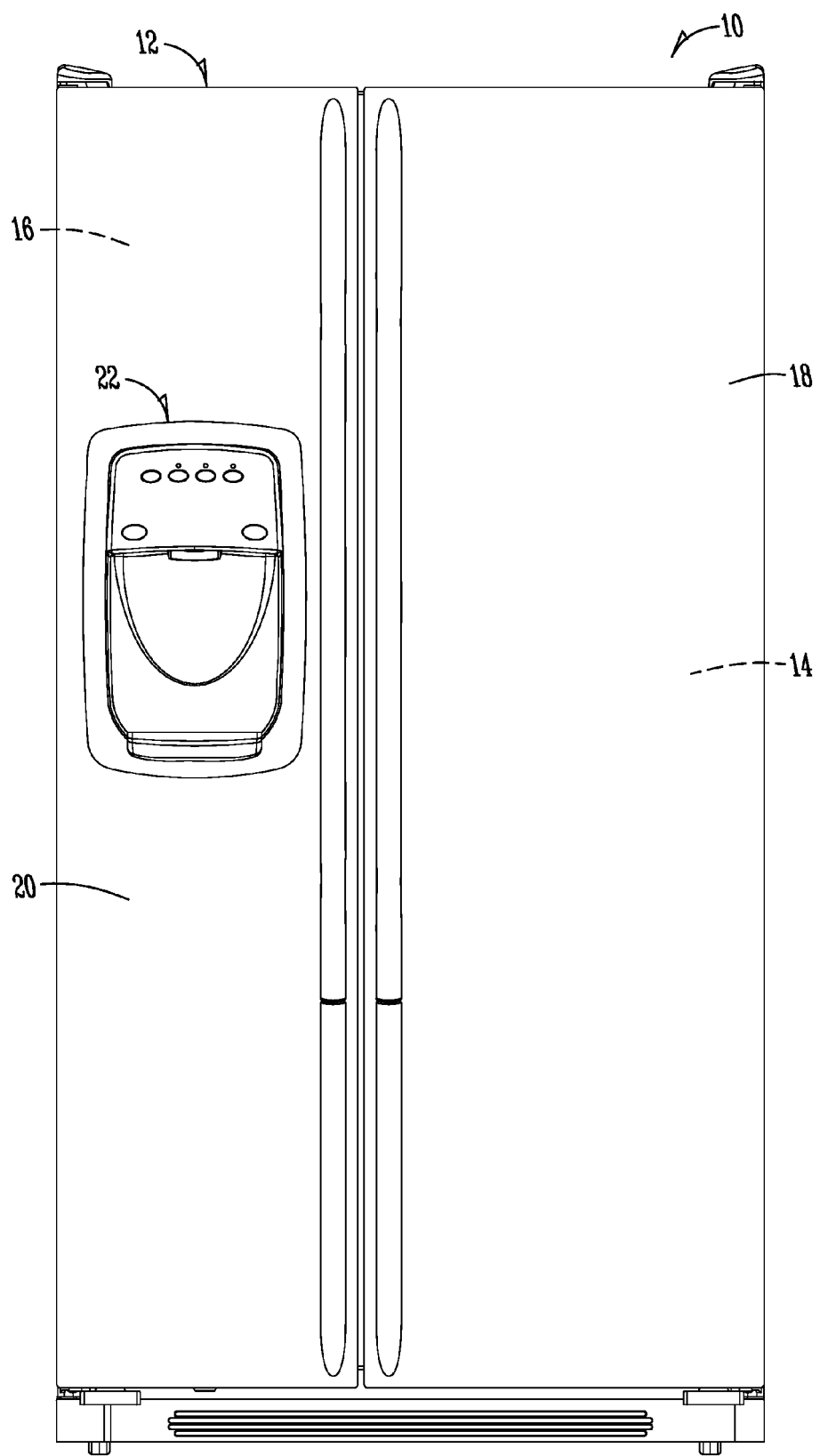
FIG. 1 is a perspective view showing an embodiment of a refrigerator having a beverage dispensing system.

FIG. 1 is a perspective view showing an embodiment of a refrigerator 10 having a beverage dispensing system 22. The refrigerator 10 includes a refrigerator cabinet 12. The cabinet 12 is an insulated cabinet. The refrigerator 10 further includes a fresh food compartment 14 and a freezer compartment 16, which are disposed within the refrigerator cabinet 12. A fresh food door 18 provides access to the fresh food compartment 14. A freezer door 20 provides access to the freezer compartment 16. Although the refrigerator 10 of FIG. 1 is shown in a side-by-side configuration, the refrigerator may be otherwise configured, such as in a bottom mount configuration with French doors.

Figure 2:
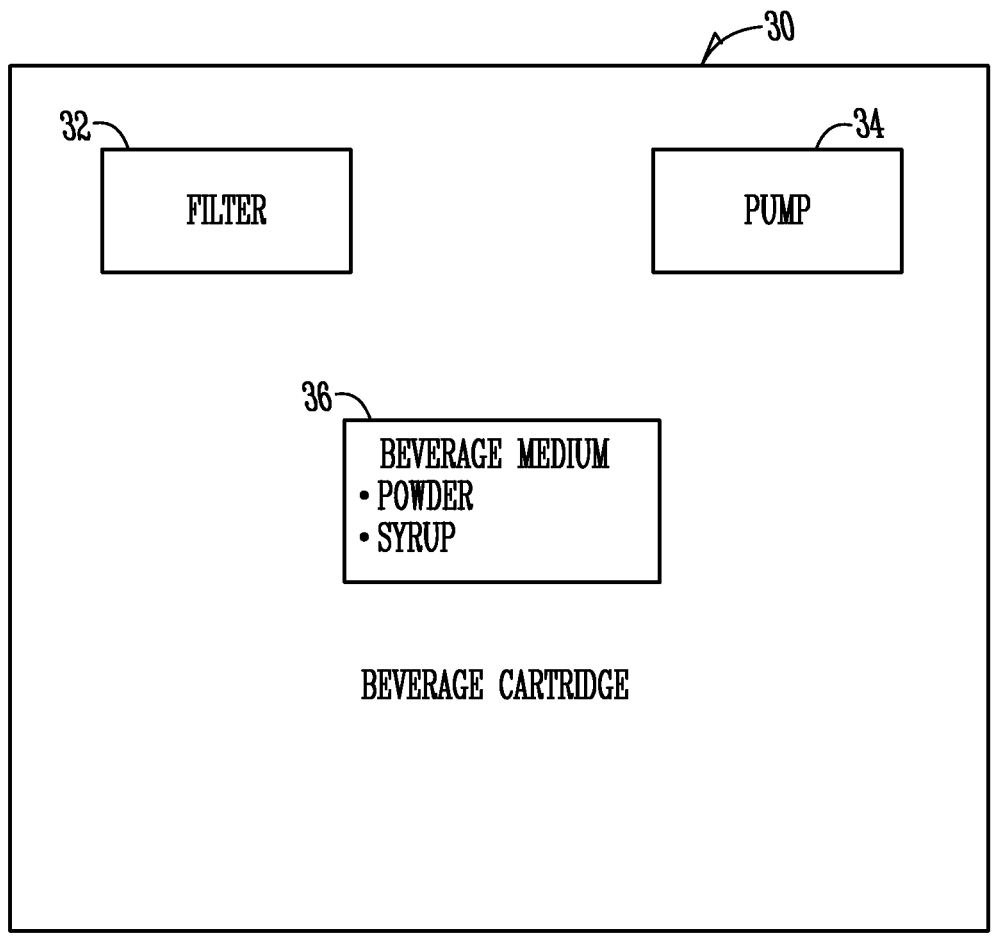
FIG. 2 is a schematic of an embodiment of a beverage cartridge of the present invention.

FIG. 2 is a schematic of an embodiment of a beverage cartridge 30 that is used in combination with the beverage dispensing system 22 of the refrigerator 10. The beverage cartridge 30 may include a filter 32, a pump 34, and a beverage medium 36. The beverage medium 36 may consist of a powder, a syrup, or the like. It is to be appreciated that other beverage medium may be used and also that the filter 32 and pump 34 may be left out of the configuration of the beverage cartridge 30.

Figure 3:
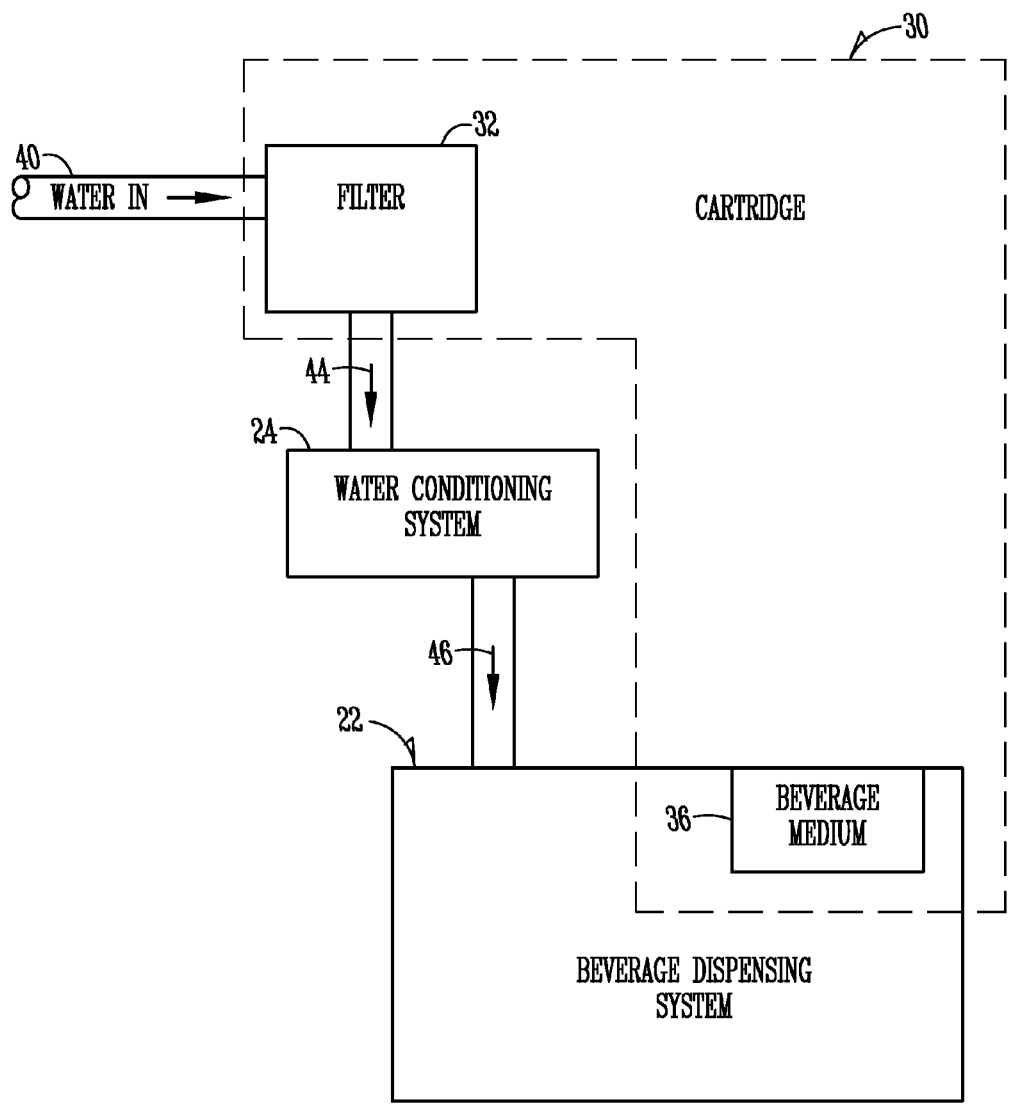
FIG. 3 is a schematic of an embodiment showing a beverage cartridge in connection with a water conditioning system and a beverage dispensing system.

FIG. 3 shows a schematic of an embodiment of the present invention showing the beverage cartridge 30 in connection and combination with a water conditioning system 24 and a beverage dispensing system 22. As shown in FIG. 3, water 40 enters the system and passes through a filter 32. The resulting filtered water 44 passes through a water conditioning system 24. The conditioned water 46 then passes into the beverage dispensing system 22. As shown in FIG. 3, the cartridge 30 includes both the filter 32 and the beverage medium 36. As is also shown, the beverage medium 36 is included in the beverage dispensing system 22, while the filter 32 is not. While this configuration is shown in FIG. 3, it is not to be considered the only configuration. It will be appreciated to note that the filter 32 may also be included as part of the beverage dispensing system 22 as well. The conditioned water 46 mixes with the beverage medium 36 in the beverage dispensing system 22 to produce a flavored beverage 52, which is determined by the beverage medium 36. The flavored beverage 52 may then be dispensed from the beverage dispensing system 22 into a container (not shown) of a user's choice.

Figure 4:
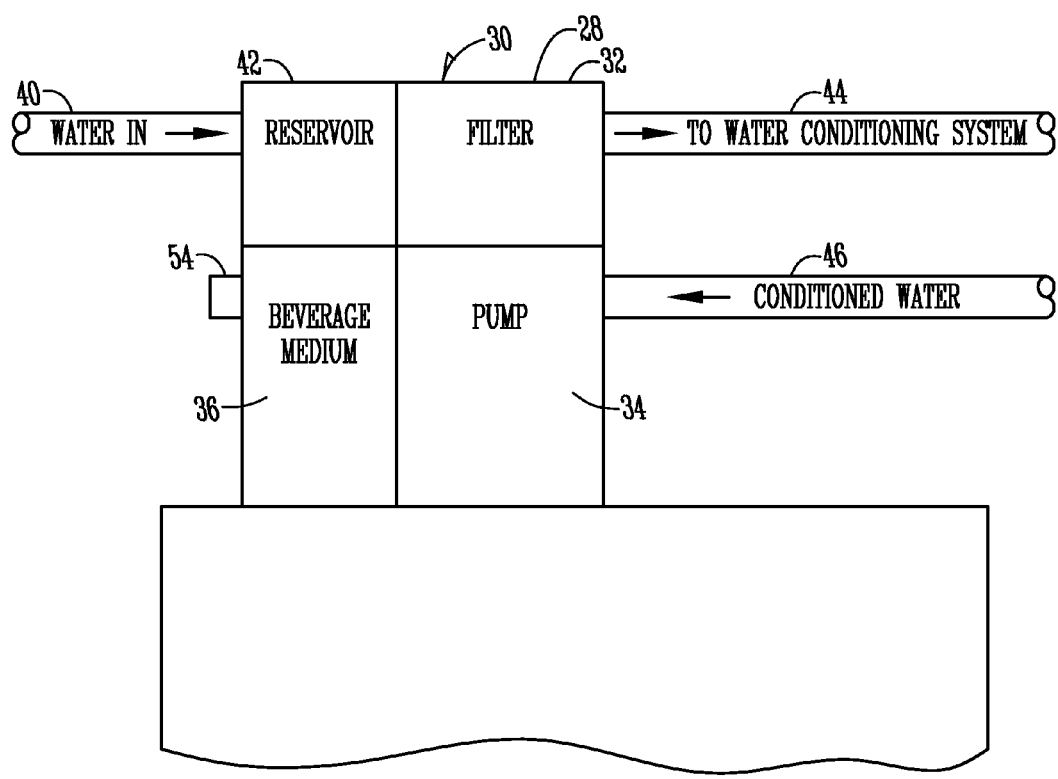
FIG. 4 is a schematic of another embodiment of a beverage cartridge of the present invention in combination with a water system.

FIG. 4 is a schematic of another embodiment of a beverage cartridge 30 of the present invention in combination with a water system 38. As shown in FIG. 4, the beverage cartridge 30 includes a cartridge housing 28, a reservoir 42 disposed within the housing, a filter 32 disposed within the housing, a pump 34 disposed within the housing, a beverage medium 36 disposed within the housing, and a beverage medium access opening 54. The cartridge housing 28 may be configured to operatively connect to a beverage dispensing system 22 of a refrigerator 10. In this embodiment, water 40 will be passed into the cartridge reservoir 42. From there, the water will pass through a filter 32 and the resulting filtered water 44 will move to a water conditioning system 24, which is not shown in this figure. The conditioned water 46 will then be pumped by the pump 34 through the cartridge 30 and will pass through a beverage medium 36 before passing on through the beverage dispensing system 22. Also shown in this figure is a beverage medium access opening 54. The beverage medium access opening 54 may be, but is not limited to, a hole, an aperture covered by a lid, a port, a cover attached to the housing by a screw or other attaching means, or another means which allows access to refill the beverage medium 36 in the cartridge 30. The beverage medium access opening 54 may allow a user to refill a beverage medium 36 at home, at a store, or at another location. The refilling may consist of adding more medium, such as syrup or powder to the cartridge. It should be appreciated that other methods of refilling the cartridge with beverage medium may be used. It should also be appreciated that the user may be able to adjust the amount of flavor in the beverage by adjusting the level of beverage medium added to the cartridge 30.

Figure 5:
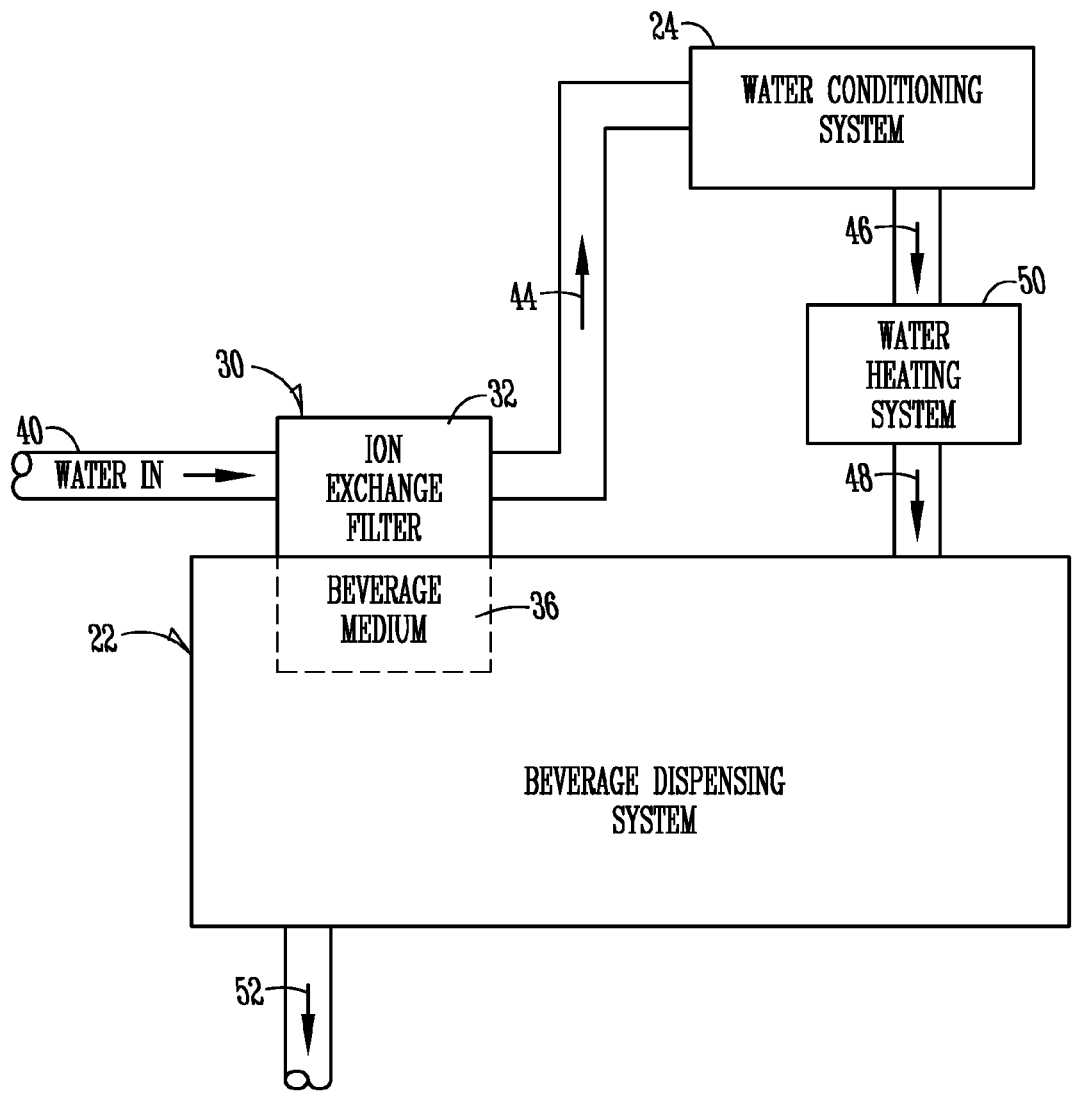
FIG. 5 is a schematic of another embodiment of the present invention showing a beverage cartridge in connection with a water conditioning system and a beverage dispensing system.

FIG. 5 is a schematic of another embodiment of the present invention showing a beverage cartridge 30 in connection with a water conditioning system 24 and a beverage dispensing system 22. A water heating system 50 is also connected to the beverage dispensing system 22. In this embodiment, the reusable cartridge 30 includes filter 32 and a beverage medium 36. A type of filter 32 that may be used is an ion exchange filter, which removes ions from the water; however, other types of filters may also be used, such as carbon filters. Water 40 is passed through the filter 32. The filtered water 44 will then pass through the water conditioning system 24 to produce conditioned water 46. The conditioned water 46 is next passed through the water heating system 50 to produce hot water 48. The hot water 48 will then be passed into a beverage dispensing system 22, which includes the beverage medium 36 of the beverage cartridge 30. Passing the hot water 48 through the beverage medium 36 produces a flavored beverage 52. The flavored beverage 52 is then dispensed from the beverage dispensing system 22 and into a container (not shown) of a user.

Figure 6:
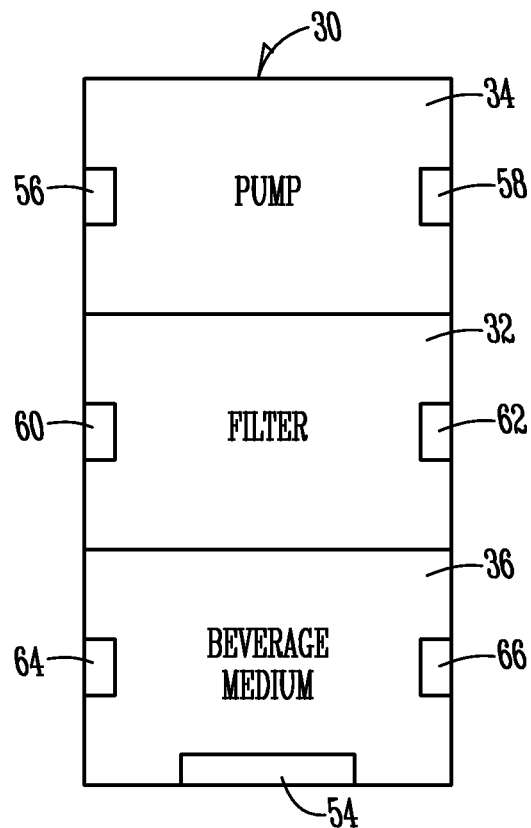
FIG. 6 is a schematic of an embodiment of a beverage cartridge of the present invention.

Now referring to FIG. 6, an embodiment of a beverage cartridge 30 of the present invention is provided. As shown in FIG. 6, the beverage cartridge 30 includes a pump 34, a filter 32, and a beverage medium 36. Also shown in this embodiment is a pump input port 56 and a pump output port 58, with both located on the pump 34. Likewise, the filter 32 includes a filter input port 60 and a filter output port 62. The beverage medium 36 may also include a beverage medium input port 64 and a beverage medium output port 66, as well as a beverage medium access opening 54. The beverage medium access opening 54 may be used as a means of access to refill the cartridge 30 with a beverage medium 36. Although FIG. 6 shows the input ports and output ports in a specific layout, it should be appreciated that they may be moved and placed as desired. For instance, the pump input port 56 and the pump output port 58 may be switched on opposite sides, or may be placed directly beside each other, depending on the style and setup of the beverage dispensing system 22. It should also be appreciated that the filter and beverage medium input ports and output ports may be configured and designed to be located at various locations on the respected parts as well. Furthermore, the beverage access port may be moved to any location on the beverage cartridge 30, including on the pump 34 or the filter 32. The beverage medium access opening 54 may not even be required in some embodiments, but may make the refilling and reusing of the beverage cartridge 30 easier.

Although specific embodiments are described herein, the present invention contemplates numerous variations, options, and alternatives, including variations in the structure or a configuration of the refrigerator, or beverage dispensing system. The present invention is not to be limited to the specific embodiments described herein or combinations of the specific embodiments described.

What is claimed:
1. A refrigerator, comprising:
a refrigerator cabinet;
a freezer compartment disposed within the refrigerator cabinet;
a fresh food compartment disposed within the refrigerator cabinet;
a door for providing access to the fresh food compartment;
a beverage dispensing system operatively connected to the door; and
a single cartridge the cartridge comprising a filter, a pump, and a beverage medium all disposed within the cartridge, said beverage medium being a powder; and
wherein the cartridge is configured to filter water with the filter to produce filtered water and pump the filtered water through the beverage medium using the pump and substantially all within the cartridge;
whereby the beverage dispensing system includes the beverage medium but not the filter;

said single pump configured to pump the water into and out of the cartridge; and said single cartridge being refillable with said beverage medium through a beverage medium access port in the cartridge, said single cartridge being reusable such that the single cartridge can be used in conjunction with the beverage dispensing system more than once;

said filter and said pump being the same with each reuse of said single cartridge.

2. The refrigerator of claim 1 further comprising a water system disposed within the refrigerator cabinet to supply water to the cartridge for exposure to the medium to form a beverage drink for dispensement from the beverage dispensing system.

3. The refrigerator of claim 2 wherein the beverage dispensing system further comprising a heating system.

4. The refrigerator of claim 3 wherein the filter comprises an ion filter adapted to remove minerals in the water.

5. The refrigerator of claim 4 wherein the water is hot water.

6. The refrigerator of claim 1 wherein the cartridge further comprises a reservoir.

7. The refrigerator of claim 1 wherein the cartridge comprises a plurality of input ports and a plurality of output ports.

8. The refrigerator of claim 7 wherein the plurality of input ports includes a filter input port and wherein the plurality of output ports includes a filter output port.

9. The refrigerator of claim 7 wherein the plurality of input ports includes a pump input port and wherein the plurality of output ports includes a pump output port.

10. A method of reusing a flavor cartridge in a refrigerator beverage dispensing system of a refrigerator to produce a flavored beverage, comprising:

providing a single, reusable cartridge filled with a beverage medium, said medium being a powder, the cartridge also including a single pump and a filter disposed therein;

passing water through the filter outside of the beverage dispensing system to produce filtered water;

passing the filtered water through the beverage medium in the beverage dispensing system via the single pump in the cartridge to produce a flavored beverage for dispensing from the refrigerator; and dispensing the flavored beverage via the single pump;

wherein the water is filtered and passed through the beverage medium substantially all within the single, reusable cartridge;

said single cartridge being refillable through a beverage medium access port with said beverage medium and reusable such that the single cartridge can be used in conjunction with the beverage dispensing system more than once;

said filter and said pump being the same with each reuse of said single cartridge.

11. The method of claim 10 wherein the pump of the cartridge passes the filtered water into the beverage dispensing system, including through the beverage medium in the reusable cartridge.

12. The method of claim 10 further comprising dispensing the flavored beverage from the refrigerator.

13. The method of claim 10 wherein the filter includes an ion exchange filter.

14. The method of claim 13 further comprising passing the filtered water through a heating system to produce hot water.

15. The method of claim 14 wherein the flavored beverage is a hot flavored beverage.

16. A refrigerator, comprising:

a refrigerator cabinet;

a freezer compartment disposed within the refrigerator cabinet;

a fresh food compartment disposed within the refrigerator cabinet;

a door for providing access to the fresh food compartment;

a beverage dispensing system operatively connected to the door; and a single cartridge the cartridge comprising a filter, a pump, and a beverage medium all disposed within the cartridge, said beverage medium being a powder; and wherein the cartridge is configured to filter water with the filter to produce filtered water and pump the filtered water through the beverage medium using the pump and substantially all within the cartridge;

whereby the beverage dispensing system includes the beverage medium but not the filter;

said single pump configured to pump the water into and out of the cartridge; and said single cartridge being refillable with said beverage medium through a beverage medium access port in the cartridge, said single cartridge being refillable and reusable such that the single cartridge can be used in conjunction with the beverage dispensing system more than once;

said filter and said pump being the same with each reuse of said single cartridge.

* * * * *